United States Patent

[11] 3,628,662

| [72] | Inventor | Walter J. Kudlaty<br>Elmhurst, Ill. |
|---|---|---|
| [21] | Appl. No. | 22,867 |
| [22] | Filed | Mar. 26, 1970 |
| [45] | Patented | Dec. 21, 1971 |
| [73] | Assignee | Marvel Engineering Company<br>Chicago, Ill. |

[54] FILTER ANTIDRAIN VALVE ASSEMBLY
3 Claims, 2 Drawing Figs.

[52] U.S. Cl. ..................................... 210/136,
210/234
[51] Int. Cl. ........................................ B01d 35/16

[50] Field of Search ............................................. 210/234,
130, 133, 134, 136

[56] References Cited
UNITED STATES PATENTS

| 2,894,630 | 7/1959 | Humbert, Jr. ................ | 210/133 |
| 1,955,903 | 4/1934 | Cammen ..................... | 210/130 X |
| 2,418,777 | 4/1947 | Le Clair ....................... | 210/134 |

Primary Examiner—Frank A. Spear, Jr.
Attorney—Parker, Carter & Markey

ABSTRACT: A filter assembly having a one-way valve precluding escape of fluid when the assembly is opened.

PATENTED DEC 21 1971
3,628,662
Fig. 1.
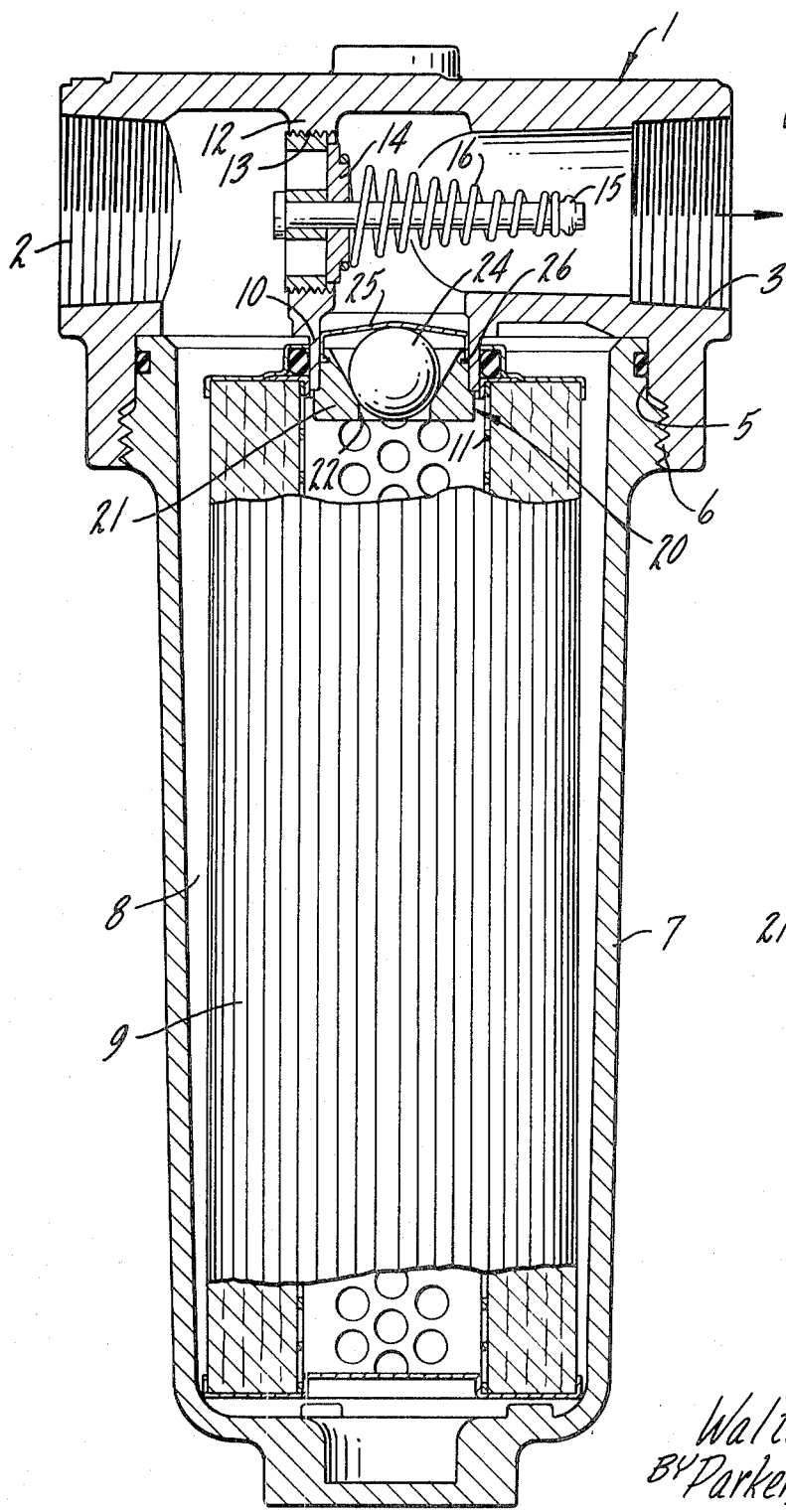
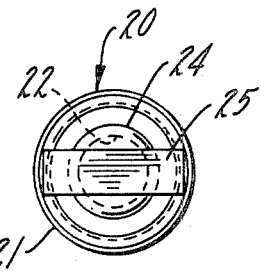
Fig. 2.
INVENTOR.
Walter J. Kudlaty
BY Parker, Carter & Markey
Attorneys.

FILTER ANTIDRAIN VALVE ASSEMBLY

SUMMARY OF THE INVENTION

This invention relates to filters and has particular relation to a filter assembly incorporating a head and a housing removably secured thereto.

One purpose of the invention is to provide such a filter assembly having means insuring against loss of fluid when said head and housing are separated.

Another purpose is to provide a filter assembly having an antidrain structure.

Another purpose is to provide a filter assembly having an antidrain valve element including means insuring against escape of said element or portions thereof with filtered fluid.

Another purpose is to provide a filter assembly including an antidrain valve pretensioned in closed position.

Another purpose is to provide an antidrain valve element selectively usable with a filter assembly.

Another purpose is to provide an antidrain valve element including means insuring against escape of parts thereof.

Another purpose is to provide an assembly described of maximum simplicity and economy in construction and use.

Other purposes may appear from time to time during the course of the specification and claims.

BRIEF DESCRIPTION OF THE DISCLOSURE

The invention is illustrated more or less diagrammatically in the accompanying drawings wherein:

FIG. 1 is a side view shown in partial cross section; and
FIG. 2 is a detail view.

Like parts are indicated by like numerals throughout the specification and drawings.

DESCRIPTION OF THE PREFERRED EMBODIMENT

Referring now to the drawings, the numeral 1 generally designates a filter head. The head 1 has an inlet 2 and an outlet 3, the outlet being connectable to an area or reservoir containing fluid, such as that indicated schematically at 4, for delivery of filtered fluid thereto. It will be understood that the inlet 2 is connectable to a source of fluid requiring filtering. The head 1 has an opening 5 in which is suitably connected, as by the threads 6, a filter element housing 7. The housing 7 defines a chamber 8 in which a suitable filter element 9 is positioned. As is well known, the inlet 2 communicates with the chamber 8 for delivery of unfiltered fluid thereto.

The outlet 3 is in communication, through the sleeve 10 in head 1, with the internal perforated core 11 of filter element 9.

A membrane wall 12 in head 1 is apertured as at 13 to receive the bypass valve assembly 14 openable to communicate the inlet 2 directly with the outlet 3, bypassing the chamber 8, element 9 and sleeve 10. Valve assembly 14 includes a valve stem 15 extending across sleeve 10 and bearing valve spring 16 thereon.

Positioned within sleeve 10 and controlling communication between outlet 3 and core 11 is an antidrain check valve element 20. The element 20 includes a plug member 21 suitably secured, preferably by a press fit, within the sleeve 10. The member 21 is axially bored, as indicated at 22, the bore 22 flaring outwardly toward the outlet 3 to form a seat for the ball valve element 24. Overlying the valve member 24 is a leaf spring member 25, the opposite ends of which are bent in parallel toward the member 24 and again bent inwardly for reception within groove 26 formed in the circumferential surface of member 21.

In use the fluid entering inlet 2 is filtered by element 9 and thereafter holds valve 24 open for flow through outlet 3 to reservoir 4, for example. The pressure or pressures of the filtered fluid arriving at the valve 24 are known and spring 25 is tensioned at a predetermined level to assure opening of the valve 24 at said pressures as well as closing of the valve 24 when said fluid is at a lower predetermined pressure. As shown in FIG. 2, elements 20, 24, 25 are preassembled before pressure. As shown in FIG. 2, elements 20, 24, 25 are preassembled before press fitting into sleeve 10, thus providing the pretension of spring 25 which remains constant throughout the operation of the device.

Spring 25 is secured to member 24 in such manner as to insure against escape of the spring. Once the element 20 has been installed even if the spring 25 should break, its parts would continue to be retained by the entrapment of the opposite ends of spring 25 between member 21 and the inner surface of sleeve 10. Similarly, the spring 16 overlying the point of communication between sleeve 10 and outlet 3 prevents escape of the ball 24 with the filtered fluid if the all 24 should escape through a broken spring 25.

It is understood that the housing 7 is removable from head 1 for the purpose, for example, of exchanging a contaminated filter 9 with a fresh or cleaned filter element 9. When a supply of fluid is present at outlet 3 as, in the example shown, from the reservoir 4, the valve element 20 insures against a draining or loss of such fluid when the housing 7 is removed from head 1. Even if spring 25 were broken and ball 24 had escaped member 21, such reverse flow through the outlet 3 toward sleeve 10 would carry the ball 24 into its antidrain, head-closing position shown in the drawing and only a minimal fluid losss would occur.

The embodiments of the invention in which an exclusive property or privilege as claimed are defined as follows:

1. A filter assembly including a head, a housing removably secured to said head, a filter element in said housing, an inlet communicating with one side of said filter element, an outlet communicating with the other side of said filter element and a one-way valve element having a first position permitting communication between said other side of said filter element and said outlet and yieldingly urged into a second position closing communication between said outlet and said other side of said filter element, said valve element including a fitting having an axial bore flared in the direction of said outlet and forming a seat, a ball valve member and means yieldingly urging said valve member toward said seat, said yielding means including a leafspring overlying said ball valve member and having its opposite ends secured to said fitting.

2. The structure of claim 1 wherein said means includes a leafspring having its opposite ends received in corresponding grooves in said fitting.

3. The structure of claim 2 wherein said head includes a sleeve defining said point of communication between said other side of said filter element and said outlet, said valve element is positioned in said sleeve and said opposite ends of said leaf spring are trapped between said fitting and the inner surface of said sleeve.

* * * * *